US009719433B2

(12) United States Patent
Shizume et al.

(10) Patent No.: US 9,719,433 B2
(45) Date of Patent: Aug. 1, 2017

(54) ENGINE OUTPUT CONTROL DEVICE

(75) Inventors: Masaru Shizume, Yokohama (JP); Yukio Sugano, Saitama (JP)

(73) Assignee: KOMATSU LTD., Tokyo (JP)

( * ) Notice: Subject to any disclaimer, the term of this patent is extended or adjusted under 35 U.S.C. 154(b) by 1446 days.

(21) Appl. No.: 13/140,871

(22) PCT Filed: Jan. 15, 2010

(86) PCT No.: PCT/JP2010/050394
§ 371 (c)(1),
(2), (4) Date: Jun. 20, 2011

(87) PCT Pub. No.: WO2010/087237
PCT Pub. Date: Aug. 5, 2010

(65) Prior Publication Data

US 2011/0251775 A1 Oct. 13, 2011

(30) Foreign Application Priority Data

Jan. 30, 2009 (JP) ................................ 2009-019363

(51) Int. Cl.
*G06F 19/00* (2011.01)
*F02D 29/02* (2006.01)
(Continued)

(52) U.S. Cl.
CPC ............ *F02D 29/02* (2013.01); *E02F 9/2246* (2013.01); *F02D 31/007* (2013.01); *F02D 2250/18* (2013.01)

(58) Field of Classification Search
CPC .... F02D 29/02; F02D 2250/18; F02D 31/007; E02F 9/2246
(Continued)

(56) References Cited

U.S. PATENT DOCUMENTS 6,220,223 B1 * 4/2001 Weisman et al. ............. 123/436
7,665,971 B1 * 2/2010 Glickman et al. .............. 417/34
(Continued)

FOREIGN PATENT DOCUMENTS

JP A-8-290891 11/1996
JP A-11-125139 5/1999
(Continued)

OTHER PUBLICATIONS

Office Action issued Aug. 14, 2012 by Japanese Patent Office in corresponding JP Application No. 2009-019363.
(Continued)

*Primary Examiner* — David Hamaoui
(74) *Attorney, Agent, or Firm* — Posz Law Group, PLC

(57) ABSTRACT

The gross output power of an engine distributed to at least one main machine and one auxiliary machine. A total load value calculation unit calculates the value of the lost power consumed by the auxiliary machine, and calculates the value of total load power by adding to this lost power value a target value for the main output power of the engine to be distributed to the main machine. A gross output value control unit controls the value of the gross output power so that the value of the gross output power becomes equal to the value of the total load power when the value of the total load power is less than a predetermined threshold value, and so that the value of the gross output power becomes equal to the above described threshold value when the value of the total load power is greater than the threshold value.

8 Claims, 7 Drawing Sheets

(51) Int. Cl.
*E02F 9/22* (2006.01)
*F02D 31/00* (2006.01)

(58) Field of Classification Search
USPC .................................... 701/50, 102, 103, 110
See application file for complete search history.

(56) References Cited

U.S. PATENT DOCUMENTS

| | | | | |
|---|---|---|---|---|
| 2007/0016355 | A1* | 1/2007 | Kamado et al. .............. | 701/103 |
| 2011/0010058 | A1 | 1/2011 | Saito et al. | |

FOREIGN PATENT DOCUMENTS

| | | | |
|---|---|---|---|
| JP | A-2001-50098 | | 2/2001 |
| JP | A-2002-36867 | | 2/2002 |
| JP | 2005-98216 | A | 4/2005 |
| JP | 2007-40301 | A | 2/2007 |
| WO | WO 2009/116250 | A1 | 9/2009 |

OTHER PUBLICATIONS

Office Action mailed on Jun. 12, 2012 issued from the Japanese Patent Office in the corresponding Japanese patent application No. 2010-548465.

The International Search Report mailed on Feb. 9, 2010 for the corresponding International patent application No. PCT/JP2010/050394 (English translation attached).

* cited by examiner

ENGINE OUTPUT CONTROL DEVICE

CROSS REFERENCE TO RELATED APPLICATIONS

This application is a U.S. national stage application of PCT/JP2010/050394 filed on Jan. 15, 2010, and claims priority to, and incorporates by reference, Japanese Patent Application No. 2009-019363 filed on Jan. 30, 2009.

TECHNICAL FIELD

The present invention relates to a device for controlling the output of an engine in correspondence to fluctuations of the load.

BACKGROUND ART

With a device for controlling the engine output of a machine, such as for example a construction machine, a technique is known (for example, refer to Patent Document #1) of calculating the total load of various types of load machinery such as a hydraulic motor, an air conditioner, a hydraulic pump, and so on, which changes from one moment to the next, and of setting the gross output of the engine by adding this total load to the main output needed for working.

According to this type of control device, it is possible to ensure the main output needed for working, even if the load of operating auxiliary machinery such as a fan and an air conditioner and so on fluctuates.

PRIOR ART DOCUMENTS

Patent Documents

Patent Document #1: Japanese Laid-Open Patent Publication 2005-98216.

SUMMARY OF THE INVENTION

Problems to be Solved by the Invention

However, according to such a prior art engine output control device as described above, since when the total load is large the gross output of the engine is also set to a large value, accordingly, while it is possible to ensure the power required for working, there is a problem of deterioration of the fuel consumption.

Furthermore while it may be considered to impose a limitation upon the gross output due to reduction of the fuel consumption, in order to ensure the main output that is required for working, the output to auxiliary machinery whose output is variable such as a radiator fan or the like is thereby undesirably reduced, and for example overheating may occur.

Accordingly, the object of the present invention is, with an engine output control device that controls the output power of an engine, to prevent deterioration of the fuel consumption of the engine, along with ensuring the engine power required for working.

Means for Solving the Problems

According to one embodiment of the present invention, in a device for controlling an engine that simultaneously drives at least one main machine and one auxiliary machine or more, there are provided a total load value calculation unit that calculates the lost power consumed by said auxiliary machine, and calculates a value of the total load power, which is the total of the power that must be supplied to said main machine and to said auxiliary machine, by adding a target value for the main output power of said engine distributed to said main machine to the value of said lost power, a gross output value control unit that controls the value of the gross output power outputted from said engine itself, according to the value of said total load power, and an engine drive control unit that controls the operation of said engine according to control of the value of said gross output power by said gross output value control unit; and said gross output value control unit decides in which of a predetermined low power region and a high power region the value of said total low power is, and controls the value of said gross output power of said engine so that the value of said gross output power of said engine does not become less than the value of said total load power when the value of said total load power is in said predetermined low power region, while controlling the value of said gross output power to so that the value of said gross output power becomes smaller than said total load power when the value of said total load power is in said high power region.

Since, according to the structure described above, when the value of the total load power described above is in the predetermined low power region, the gross output power value (in other words, the sum of the value of the lost power that is consumed by the auxiliary machine and the target value for the main output power of the engine distributed to the main machine) is controlled so as not to become less than the value of the total load power, accordingly, even though the value of the lost power that is consumed by the auxiliary machine may fluctuate, it is still possible to keep the value of the main output power supplied to the main machine at the above described target value. If the above described target value is set appropriately in advance, then it is possible for the main machine to exhibit the desired performance. Since, in addition to this, when the value of the above described total load power is in the high power region, then the value of the gross output power is controlled so as to become less than the value of the above described total load power, accordingly the gross output power never becomes excessively great, and it is possible to prevent deterioration of the fuel consumption.

In a preferred embodiment of the present invention, when the value of the above described total load power is in the high power region, no particular limit is imposed upon the operation of the auxiliary machine. As a result, it is possible for the auxiliary machine to exhibit sufficient performance, and it is possible to prevent problems that originate in performance shortages of the auxiliary machine, for example overheating of the engine or the like.

In a preferred embodiment of the present invention, said gross output value control unit has a threshold value that is set within the range of variation of the value of the gross output power, and has said high power region in the region in which the value of said total load power is larger than said threshold value, while having said low power region in the region in which the value of said total load power is smaller than said threshold value. Accordingly, when the value of the above described total load power exceeds the above described threshold value, the value of the gross output power of the engine is suppressed so as to become smaller than the value of the above described total load power. By setting the threshold value described above in an appropriate manner, it is possible to reduce problems of decrease of the main output power originating in the above described suppression of the gross output power to a level that can be ignored in actual practice.

In a preferred embodiment of the present invention, said gross output value control unit controls the value of said gross output power to become equal to said threshold value when the value of said total load power is in said high power region. Accordingly, if said threshold value is appropriately set according to the desired value of the engine fuel consumption, even if the lost power due to the auxiliary machine becomes great, still the problem of the gross output power becoming greater than the above desired threshold value and the fuel consumption deteriorating below the desired value is prevented.

In a preferred embodiment of the present invention, said gross output value control unit controls the value of said gross output power to become equal to the value of said total load power when the value of said total load power is in said low power region. Accordingly, when the value of said total load power is small and the fuel consumption is not bad, it is possible to distribute sufficient power to the main machine and to the auxiliary machine, and it is possible for both the main machine and also the auxiliary machine to exhibit their desired performance.

In a preferred embodiment of the present invention, said total load value calculation unit changes said target value for said main output power according to the rotational speed of said engine. By appropriately changing the above described target value according to the rotational speed of the engine, it is possible appropriately to control the value of the main output that is supplied to the main machine according to the rotational speed of the engine.

In a preferred embodiment of the present invention, said total load value calculation unit: from a plurality of sensors that detect the respective state values of some two or more of said auxiliary machines, inputs signals specifying said two or more state values; determines two or more candidate values for the power consumed by said some auxiliary machines on the basis of said two or more respective state values specified by said signals that are inputted; and selects the maximum value among said two or more candidate values that have been determined as the value of lost power consumed by said some auxiliary machines. In this manner, the maximum consumed power value is selected from among the different values of power consumed by these auxiliary machines that are respectively estimated from the state values of different types that relate to these auxiliary machines, and is used in the calculation of the above described total load power value. Due to this the fear is reduced of, in the control calculation, estimating the value of the lost power (i.e. of the consumed power) due to the auxiliary machines as being less than it actually is. And, due to this, the control of the gross output power of the engine becomes more appropriate.

EMBODIMENT FOR IMPLEMENTATION OF THE INVENTION

An embodiment of the present invention will now be explained with reference to the drawings, by citing as an example a case in which the invention is applied to a dump truck, which is one type of construction machine. However, this embodiment could also be applied to a construction machine of some type other than a dump truck, or to a working machine.

Figure 1:
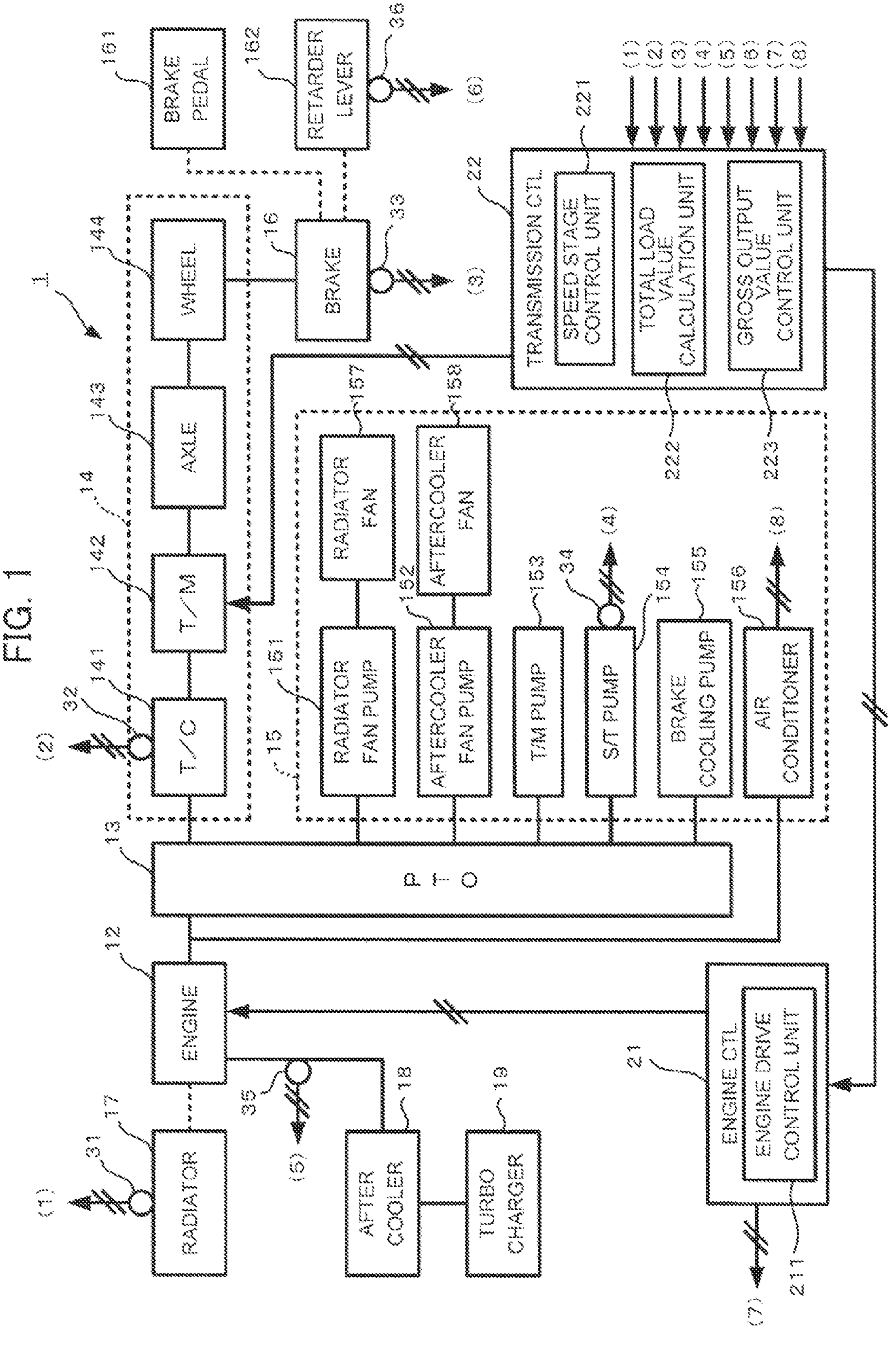
FIG. 1 is a block diagram schematically showing the overall structure of a dump truck.

FIG. 1 is a block diagram schematically showing an example of the overall structure of a dump truck.

This dump truck 1, for example, comprises an engine 12, a propulsion device 14 for propelling the dump truck, hydraulic pumps 151 through 155 of various types, an air conditioner 156, and an output splitter (PTO: Power Take Off) 13 that distributes the output (i.e. the output power) of the engine 12 to the propulsion device 14 and to the hydraulic pumps 151 through 155. The propulsion device 14, the hydraulic pumps 151 through 155, and the air conditioner 156 are driven by the output of the engine 12.

In the explanation of this specification, the terms "main machine", "auxiliary machine", "gross output power", "lost power", and "main output power" are used with the following meanings. In this embodiment, among the devices of various types that are driven by the output of the engine, for example the devices 14, 151 through 155, and 156 described above, the propulsion device 14 is a machine that provides the principal function of "propulsion". The device that provides this principal function (in this embodiment, the propulsion device 14) is termed the "main machine" (if the construction machine or working machine is of a different type, which sub-machine of this construction machine or working machine is termed the "main machine" maybe different). On the other hand, the devices other than the main machine that are driven by the output of the engine, in other words, in this embodiment, the hydraulic pumps 151 through 155 (the devices that are driven by these hydraulic pumps (such as a radiator fan 157 and an aftercooler fan 158 and so on) may also be included) and the air conditioner 156, are machines that provide auxiliary functions for the dump truck 1 other than its principal function. These devices that provide auxiliary functions (in this embodiment, the devices 151 through 155 and 156) are termed "auxiliary machines" 15 (if the construction machine or working machine to which the engine is mounted is of a different type, which sub-machines of this construction machine or working machine are termed "auxiliary machines" may be different).

Furthermore, the output power that the engine 12 itself outputs is termed the "gross output power". Moreover, the power that is distributed from the engine 12 to the auxiliary machines 15 (in this embodiment, to the hydraulic pumps 151 through 155 and to the air conditioner 156) and is consumed by those auxiliary machines 15 corresponds to loss of output power from the point of view of the main machine 14, and consequently the power that is consumed by those auxiliary machines 15 is termed "lost power". And the power that is obtained by subtracting the lost power from the gross output power of the engine 12, in other words the output power that is distributed to the main machine (in this embodiment, the propulsion device 14), is termed the "main output power".

The propulsion device 14 comprises, for example, a torque converter (T/C) 141, a transmission (T/M) 142, an axle 143, and wheels 144. The power from the engine 12 that is distributed to the propulsion device 14 is supplied to the wheels 144 via the torque converter 141, the transmission 142, and the axle 143.

For example, the hydraulic pumps of various types 151 through 155 may be a radiator fan pump 151, an aftercooler fan pump 152, a transmission pump 153, a steering pump 154, and a brake cooling pump 155. In this embodiment, the radiator fan pump 151 and the aftercooler fan pump 152 may, for example, be variable capacity type hydraulic pumps. On the other hand, in this embodiment, the transmission pump 153, the steering pump 154, and the brake cooling pump 155 may, for example, be fixed capacity type hydraulic pumps.

The transmission pump 153 is a hydraulic pump for supplying working hydraulic fluid to the torque converter 141 and to the transmission 142. The steering pump 154 is a hydraulic pump for supplying working hydraulic fluid to a steering mechanism (not shown in the drawings) and to a hoist mechanism (not shown in the drawings) for a load bearing body. And the brake cooling pump 155 is a hydraulic pump for supplying brake cooling fluid to a brake 16 (i.e. a retarder brake).

The radiator fan pump 151 is a hydraulic pump for supplying working hydraulic fluid to a radiator fan 157, which performs cooling of a radiator 17. This radiator 17 is a device for cooling the cooling water for the engine 12. The cooling water not only cools the engine 12, but also performs cooling of the brake cooling hydraulic fluid, of the working hydraulic fluid for the torque converter 141 and the transmission 142 (hereinafter this will be termed the "T/C working hydraulic fluid"), and of the working hydraulic fluid for the steering mechanism and the hoist mechanism (hereinafter this will be termed the "steering working hydraulic fluid"). This cooling of the brake cooling hydraulic fluid by the cooling water is performed, for example, via a hydraulic fluid cooler (not shown in the drawings).

The aftercooler fan pump 152 is a hydraulic pump for supplying working hydraulic fluid to an aftercooler fan 158 for cooling an aftercooler 18. This aftercooler 18 is a device for reducing the temperature of the compressed air from a turbocharger 19 and taken into the engine 12, and for thus enhancing the efficiency for charging oxygen into the cylinders of the engine 12.

The brake 16 operates as a foot brake upon actuation of a brake pedal 161, and also operates as a retarder brake according to the amount of actuation of a retarder lever 162.

This dump truck 1 is, for example, equipped with two control devices: an engine controller 21 (hereinafter termed the "engine CTL") and a transmission controller 22 (hereinafter termed the "transmission CTL"). The engine CTL 21 principally performs control of the engine 12, while the transmission CTL 22 principally performs control of the transmission 142. In this embodiment, in addition to performing control of the transmission 142, the transmission CTL 22 also performs main information processing for controlling the gross output power of the engine 12. However, this is only an example; it would also be acceptable to arrange for the main information processing for controlling the gross output power to be performed by the engine CTL 21, or to further provide an additional controller for performing this information processing. Each of the controllers 21 and 22 is built as an electronic circuit that includes, for example, a processor and memory.

By executing a predetermined program stored in the memory of the engine CTL 21, the processor of the engine CTL 21 functions as an engine drive control unit 211. The engine drive control unit 211 is a device for controlling driving of the engine 12. In this embodiment the engine drive control unit 211, for example, controls the amount of fuel injection for the engine 12 by transmitting a signal commanding a fuel injection amount to a fuel injection device that is provided to the engine 12. As a result, the output torque and the rotational speed of the engine 12 are adjusted (in other words, the gross output power of the engine 12 is adjusted). This engine drive control unit 211 adjusts the amount of fuel injection for the engine 12 on the basis of a command outputted from a gross output control means 223 as a result of control of the gross output power value of the engine 12 that will be described hereinafter.

By executing a predetermined program stored in the memory of the transmission CTL 22, the processor of the transmission CTL 22 functions as a speed stage drive control unit 221, as a total load value calculation unit 222, and as a gross output value control unit 223. Control of the transmission 142 is performed by the speed stage control unit 221. In concrete terms, the speed stage control unit 221 controls changing over of speed stage for the transmission 142 by transmitting a signal that commands a speed stage for the transmission 142. Control of the gross output power of the engine 12 according to the theory of the present invention (hereinafter termed "gross output control") is performed by the total load value calculation unit 222 and the gross output value control unit 223 of the transmission CTL 22, and by the previously described engine drive control unit 211 of the engine CTL 21. The details of this gross output control will be described hereinafter.

Various sensors 31 through 36 are provided to the dump truck 1 for sensing in real time various state values of the various load machines described above that are driven by the engine 12 (in particular of the auxiliary machines 15). The various state values detected by these sensors 31 through 36 are used in the control of the gross output by the transmission CTL 22. In concrete terms, for example, there are provided: a cooling water temperature sensor 31 that detects the temperature of the cooling water (hereinafter termed the "cooling water temperature"), a T/C working hydraulic fluid temperature sensor 32 that detects the temperature of the T/C working hydraulic fluid (hereinafter termed the "T/C working hydraulic fluid temperature"), a brake cooling hydraulic fluid temperature sensor 33 that detects the temperature of the brake cooling hydraulic fluid (hereinafter termed the "brake cooling hydraulic fluid temperature"), a steering working hydraulic fluid temperature sensor 34 that detects the temperature of the steering working hydraulic fluid (hereinafter termed the "steering working hydraulic fluid temperature"), a compressed air temperature sensor 35 that detects the temperature of the compressed air, and a retarder lever actuation amount sensor 36 that detects the amount of actuation of the retarder lever 162. The various state values that are detected by these sensors through 36 are inputted as electrical signals to the transmission CTL 22, as respectively shown by the arrow signs (1) through (6).

Furthermore, as shown by the arrow sign (7), the value of the rotational speed of the engine 12 (number of revolutions per unit time) as measured by the engine CTL 21 is inputted as an electrical signal to the transmission CTL 22 from the engine CTL 21, and moreover, as shown by the arrow sign (8), a state value that indicates the ON/OFF state of the air conditioner 156 is inputted from the air conditioner 156. These input signals also are used for gross output control.

The total load value calculation unit 222 and the gross output value control unit 223 of the transmission CTL 22 and the engine drive control unit 211 of the engine CTL 21 perform control of the gross output on the basis of these state values of various types that are inputted as electrical signals ((1) through (8)). In the following, the gross output control according to this embodiment will be explained in concrete terms.

Figure 2:
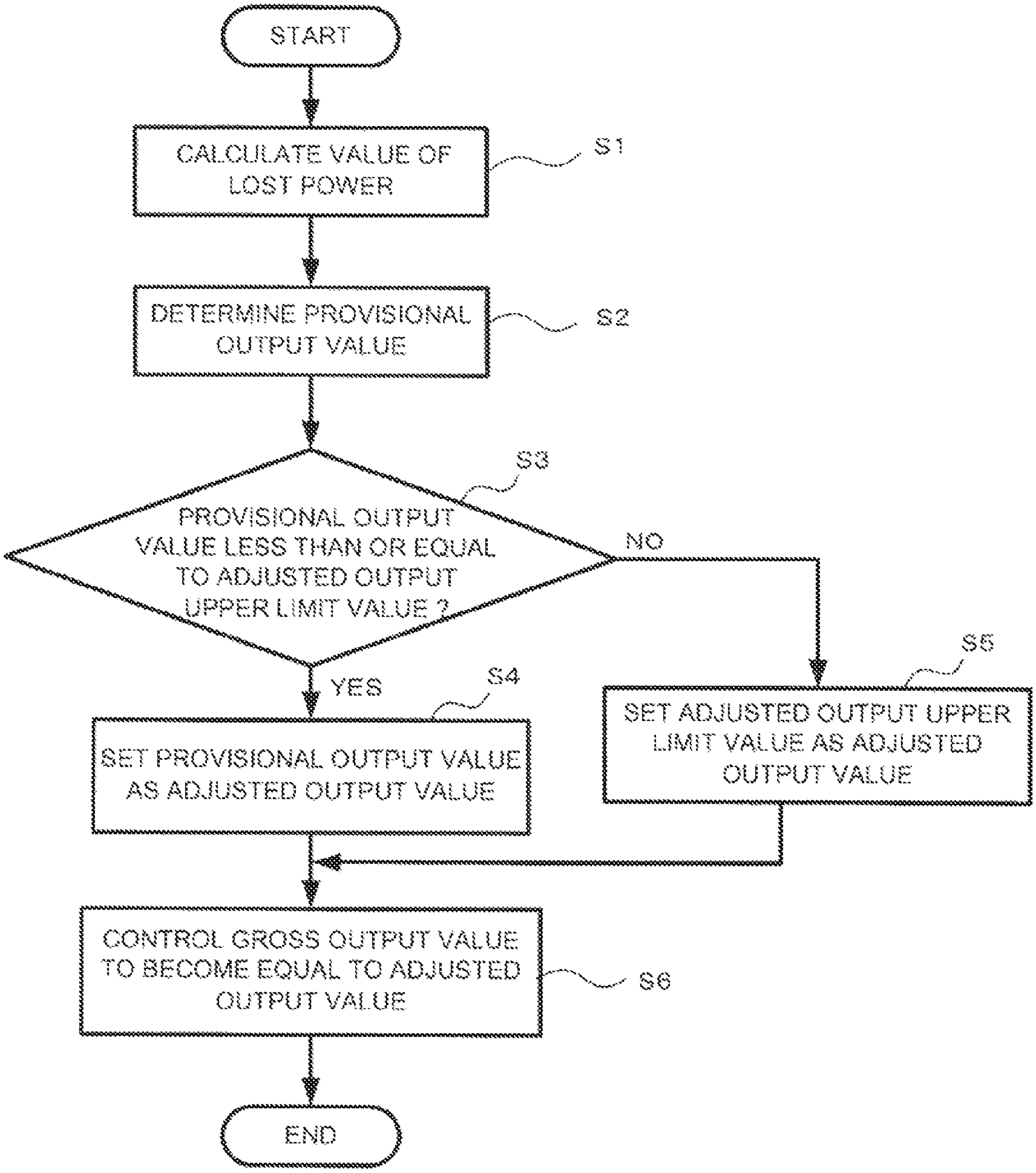
FIG. 2 is a flow chart showing a procedure for control of gross output power according to this embodiment.

FIG. 2 is a flow chart showing information processing for controlling the gross output power according to this embodiment. This information processing is executed in a mode in which it is performed continuously at substantially all times (for example, it may be repeated at a short cycle, such as once every 0.01 seconds).

First, the total load value calculation unit 222 calculates (a step S1) a value of lost power (the power consumed by the auxiliary machines 15) on the basis of the state values of various types that are inputted as electrical signals ((1) through (8) in FIG. 1). In this embodiment, the total sum of the values of the power consumed by the hydraulic pumps 151 through 155 and by the air conditioner 156 is the value of the lost power. The method by which this lost power value is calculated will be explained hereinafter with reference to FIG. 4.

Next, the total load value calculation unit 222 determines (a step S2) a provisional value of the gross output power of the engine 12 (hereinafter termed the "provisional output value"). In concrete terms, for example, the total load value calculation unit 222 calculates a value that is the total of the values of engine output power that need to be distributed to each of the various load machines (hereinafter termed the "total load value"), and determines this total load value that has been calculated as being the above described provisional output value. The total load value described above is a value that is obtained by totaling the values of power that must be distributed to the main machine 14 and to each of the auxiliary machines 15. Among these, the value of the lost power that was calculated in the step S1 described above is used as the value of the power that must be distributed to the auxiliary machines (i.e. the power that is currently being consumed by the auxiliary machines 15). On the other hand, a target value for the main output power that is determined in advance (hereinafter termed the "target main output value") is used as the value of the power that must be distributed to the main machine 14 (in this embodiment, the propulsion device).

Here, the target main output value is determined so as to satisfy the following requirement. This requirement is that, if the value of the main output power distributed to the main machine (hereinafter termed the "main output power") is equal to the target main output value, then the main machine should be capable of exhibiting its function to an adequate extent (for example, the propulsion device 14 should be capable of exhibiting adequate propulsion performance). In conclusion, the target main output value is the value that is desired for the main output power. This target main output value is determined as a function of the rotational speed of the engine 12, and changes according to the rotational speed of the engine 12 (refer to FIG. 7). The target main output value is, for example, stored in the memory of the transmission CTL 22.

Accordingly, the total load value calculation unit 222 determines the value of the total load, in other words the provisional output value, by obtaining the total of the value of the lost power calculated in the step S1, and the target main output value corresponding to the current engine rotational speed stored in the memory.

It should be understood that, as a variant example, it would also be acceptable for the target main output value described above to be set variably according to different operational states (such as, for example, the type of working that is currently being performed, such as digging or excavation, boom raising, bucket dumping or the like) of the main machine (the main machine is the propulsion device 14 in this embodiment which is a dump truck, but, with a construction machine of some other type such as a power shovel or a wheel loader or the like, the main machine may be both a working device such as a boom or a bucket that is used for working, and a propulsion device).

Thereafter, the gross output value control unit 223 makes a decision (a step S3) as to whether or not the provisional output value that has been determined in the step S2 is less than or equal to an adjusted output upper limit value that is set in advance. Here, the adjusted output upper limit value is set within the range of variability of the gross output power that can be outputted by the engine 12, so as to satisfy the following requirement. This requirement is that, if the gross output value of the engine 12 is less than or equal to the adjusted output upper limit value, the fuel consumption of the engine 12 should be less than or equal to a desired predetermined value. This adjusted output upper limit value is, for example, stored in the memory of the transmission CTL 22.

If the provisional output value is less than or equal to the adjusted output upper limit value (YES in the step S3), then the gross output value control unit 223 sets the provisional output value as the gross output value after adjustment (hereinafter termed the "adjusted output value").

On the other hand, if the provisional output value is greater than the adjusted output upper limit value (NO in the step S3), then the gross output value control unit 223 sets the adjusted output upper limit value as the adjusted output value (a step S5). Due to the steps S4 and S5, the adjusted output value does not exceed the adjusted output upper limit value, and comes to be set variably according to the total load value, within the range of being less than or equal to the adjusted output upper limit value.

Thereafter, the fuel injection amount to the engine 12 is controlled (a step S6) so that the actual gross output value outputted from the engine 12 becomes the adjusted output value set in the step S4 or S5. In concrete terms, the gross output value control unit 223 transmits a signal to the engine drive control unit 211 commanding it to perform control so that the actual gross output value of the engine 12 is brought to be equal to the adjusted output value that has been set. Upon receipt of this command signal, the engine drive control unit 211 controls the fuel injection device and adjusts the fuel injection amount to the engine 12, and as a result the actual gross output value of the engine 12 is adjusted so that it becomes equal to the adjusted output value that has been set.

The above is the overall flow of gross output control. As will be understood from this flow chart, with the control of gross output power according to this embodiment, when the above described total load value (=the above described provisional output value), which is the total of the value of the lost power that is consumed by the various auxiliary machines 15 and the target main output value that is determined in advance, is less than the adjusted output upper limit value that is set in advance (hereinafter this type of region of the total load value will be termed the "low power region"), then the value of the gross output power of the engine 12 is controlled so as to become equal to this total load value.

As a result, even if the value of the lost power for the various auxiliary machines 15 has fluctuated, the main output value that is distributed to the main machine (for example, the propulsion device 14) is maintained at the target main output value that is set in advance. Consequently, it is possible for the main machine to exhibit the performance determined in advance that it really ought to have (for example the propulsion performance of the propulsion device 14).

On the other hand, when the total load value (the total of the value of the lost power and the target main output value) is greater than the adjusted output upper limit value (hereinafter this type of region of the total load value will be termed the "high power region"), then the value of the gross output power of the engine 12 is made to agree with the adjusted output upper limit value. As a result, even if the value of the lost power due to the various auxiliary machines 15 becomes extremely great, the gross output value of the engine 12 still does not become an excessively great value that exceeds the adjusted output upper limit value. Due to this, deterioration of the fuel consumption of the engine 12 is prevented.

In this embodiment, even in the high power region, no limit is imposed upon driving of the auxiliary machines 15. Due to this, the desired operation of the auxiliary machines 15 is maintained. As a result, it is possible to prevent problems that can be brought about due to decrease of the performance of the auxiliary machines 15, such as for example overheating and so on.

Figure 3:
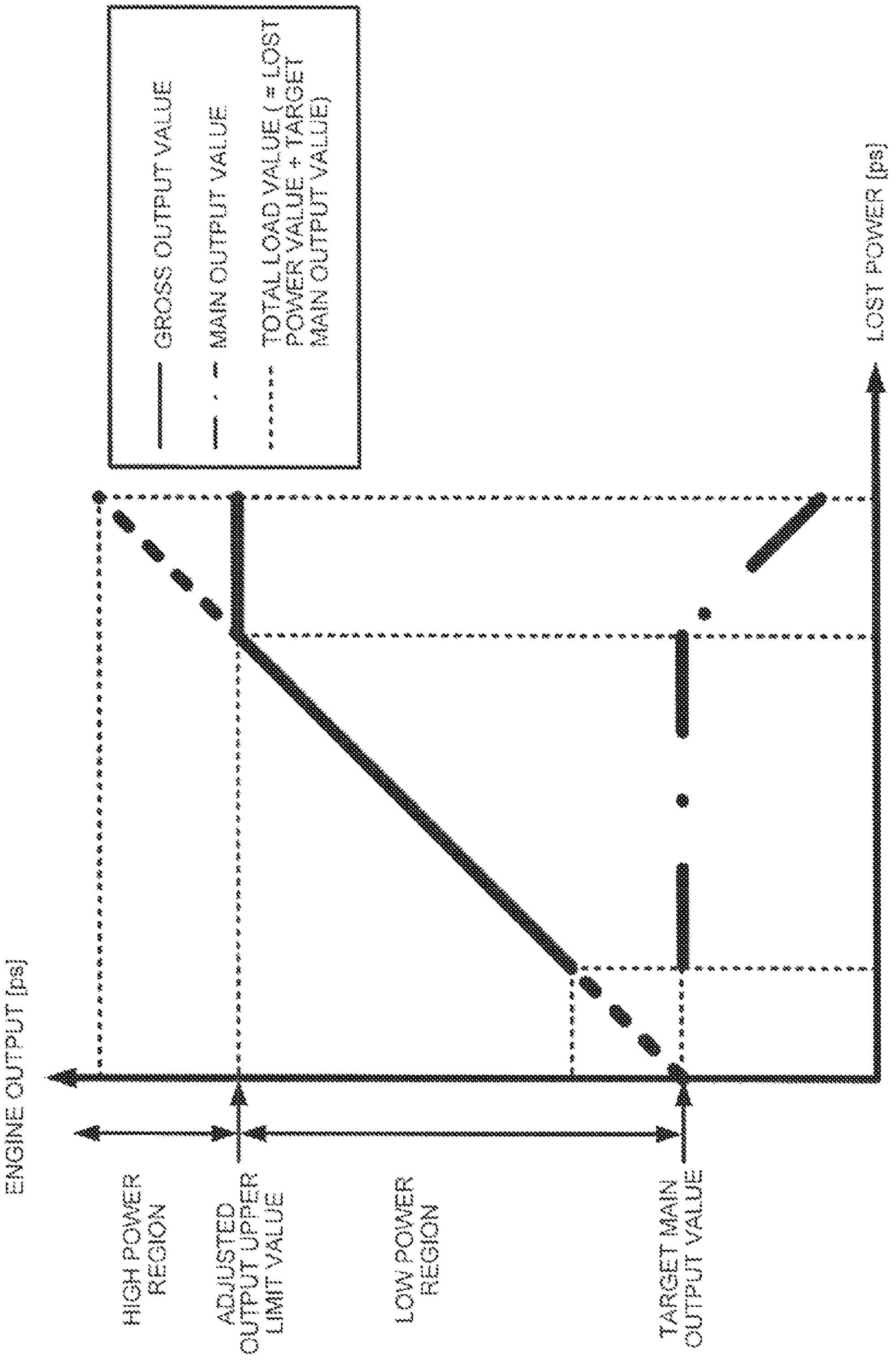
FIG. 3 is a figure showing a relationship between the gross output power, the main output power, and the lost power of an engine, when gross output power control according to this embodiment is being performed.
Figure 7:
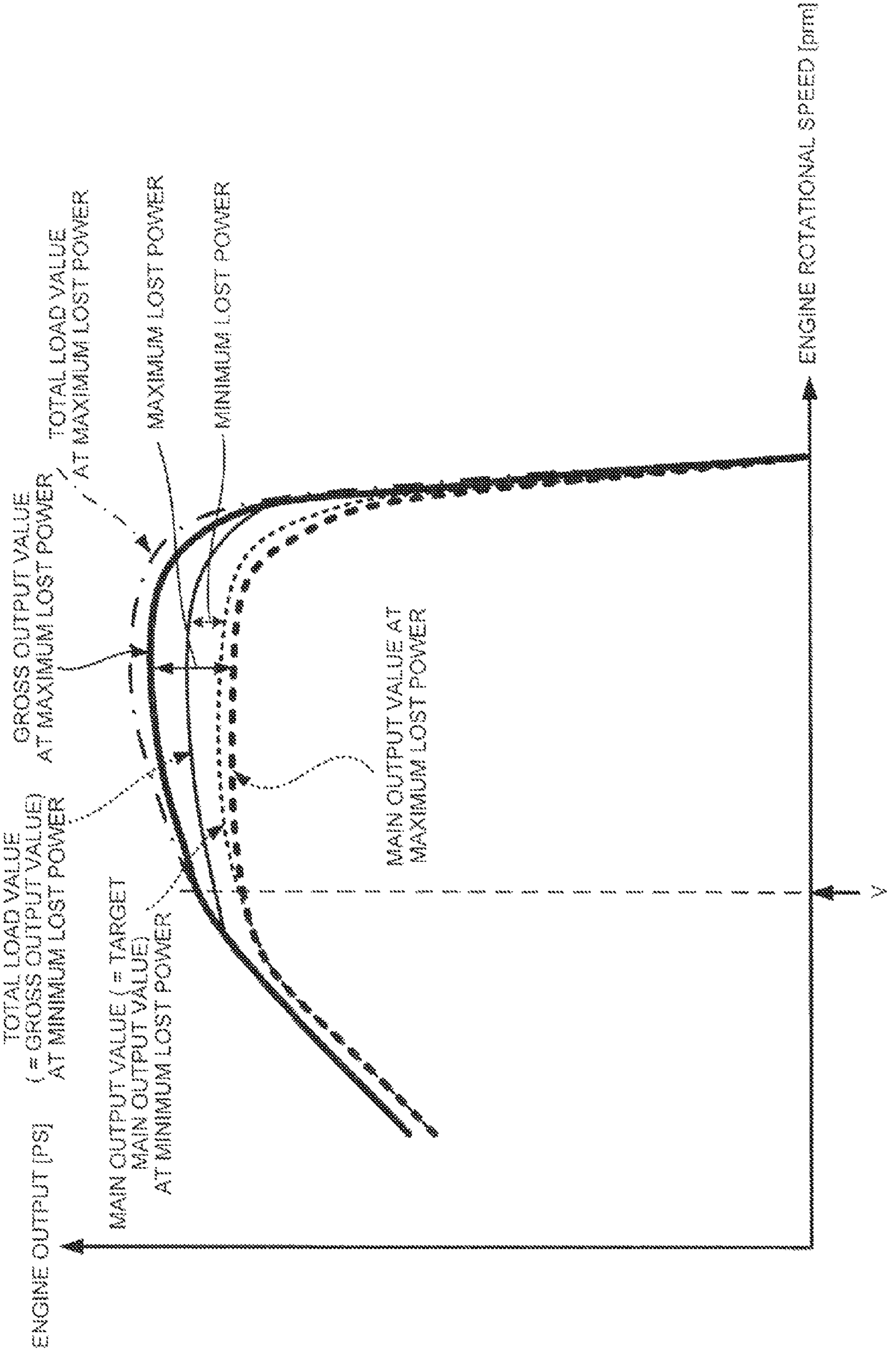
FIG. 7 is a figure showing how the engine gross output power and the main output power change with engine rotational speed, when the lost power consumed by items of auxiliary machinery changes.

FIG. 3 is a figure showing the relationship between the gross output value and the main output value of the engine 12 (along the vertical axis) and the value of the lost power (along the horizontal axis), when gross output control according to this embodiment is being performed. The solid line in FIG. 3 shows how the gross output value is controlled according to the value of the lost power. Furthermore, the single dotted broken line in FIG. 3 shows how the main output value changes according to the value of the lost power. Moreover, the dotted line in FIG. 3 shows how the total load value (the total of the lost power value and the target main output value) changes according to the value of the lost power. It should be understood that, in FIG. 3, it is supposed that the rotational speed of the engine 12 is kept constant (when the rotational speed of the engine 12 changes, the target main output value changes, as shown in FIG. 7 which will be explained hereinafter)

In the low power region (the region in which the total load value is smaller than the adjusted output upper limit value), the gross output value is adjusted so as to become equal to the total load value, as shown by the solid line in FIG. 3. Accordingly, when the lost power increases, the gross output value increases in a similar manner. Due to this, as shown by the single dotted broken line in FIG. 3, the main output value that is distributed to the main machine (for example, the propulsion device 14) is held at a value at which the performance of the main machine can be sufficiently exhibited, in other words at the target main output value, and does not bear any relationship to the value of the lost power.

When the lost power further increases, the total load value increases further in a similar manner, and in the end becomes greater than the adjusted output upper limit value (in other words, enters into the high power region). In the high power region, the gross output value is held at a fixed value (the adjusted output upper limit value), and bears no relationship to increase and decrease of the value of the lost power. In other words, the gross output value is kept down to a smaller value than the total load value shown by the dotted line in the figure. Due to this, deterioration of the fuel consumption of the engine 12 is prevented. At this time, since no limitation is imposed upon the operation of the auxiliary machines 15, accordingly the auxiliary machines 15 are supplied with sufficient power and are able to maintain their desired operation. On the other hand, as shown by the single dotted broken line, the main output value becomes smaller along with the lost power becoming greater. In this manner, in this embodiment, as compensation for preventing deterioration of the fuel consumption, the main output value that is distributed to the main device (for example the propulsion device 14) decreases to a certain extent. However, by setting the adjusted output upper limit value and the target main output value to appropriate values, even if the main output value decreases, it is still possible for the main device (for example for the propulsion device 14) to exhibit a performance level (for example a propulsion performance level) at which no problem arises in actual practice. Moreover, since the desired operation of the auxiliary machines 15 is maintained, accordingly it is possible to prevent problems that could occur due to decrease of their performance, such as overheating or the like.

Figure 4:
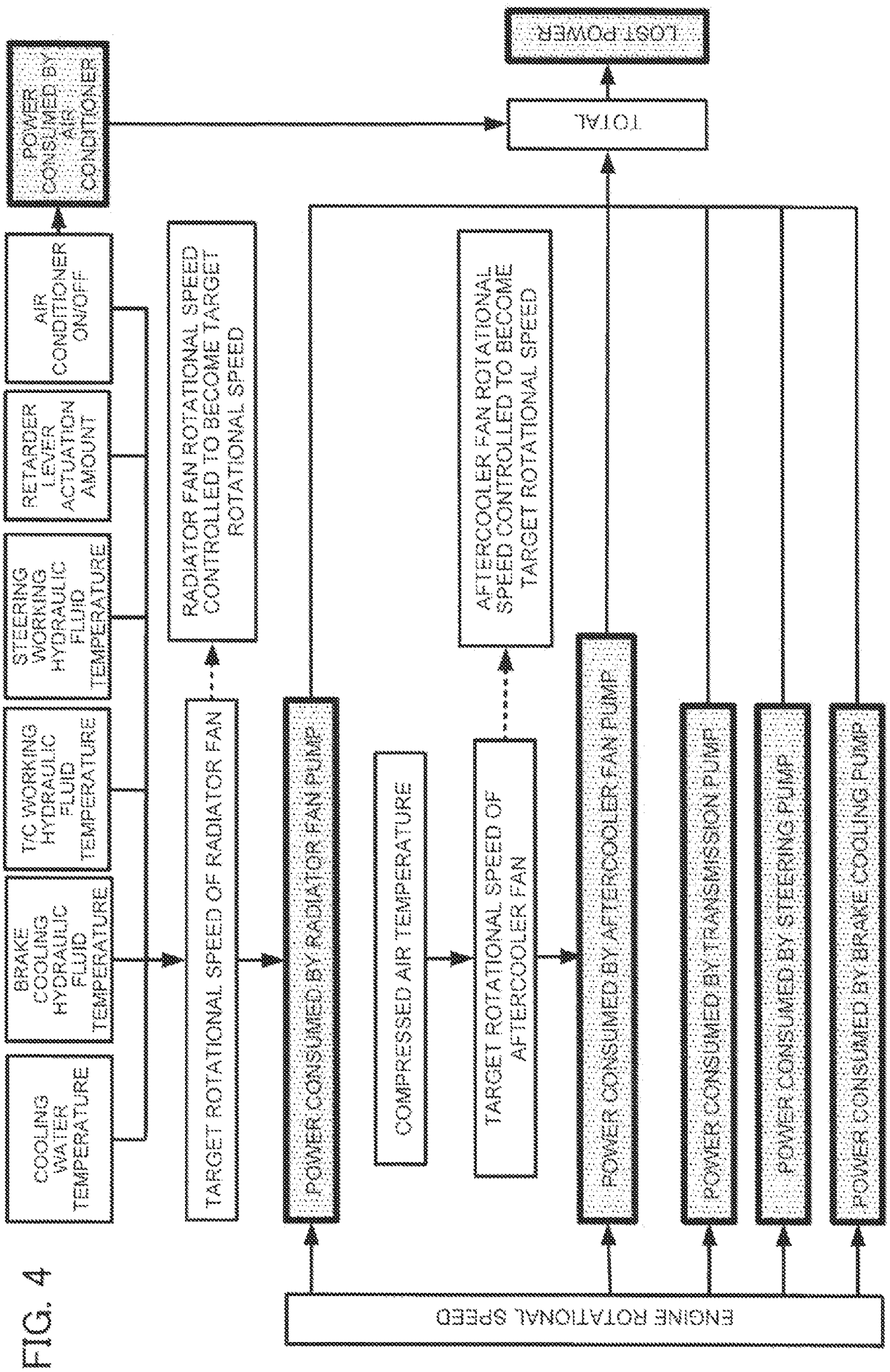
FIG. 4 is an explanatory figure for explanation of a method of calculating the lost power.

FIG. 4 is an explanatory figure for explanation of a method of calculating the lost power.

Figure 5:
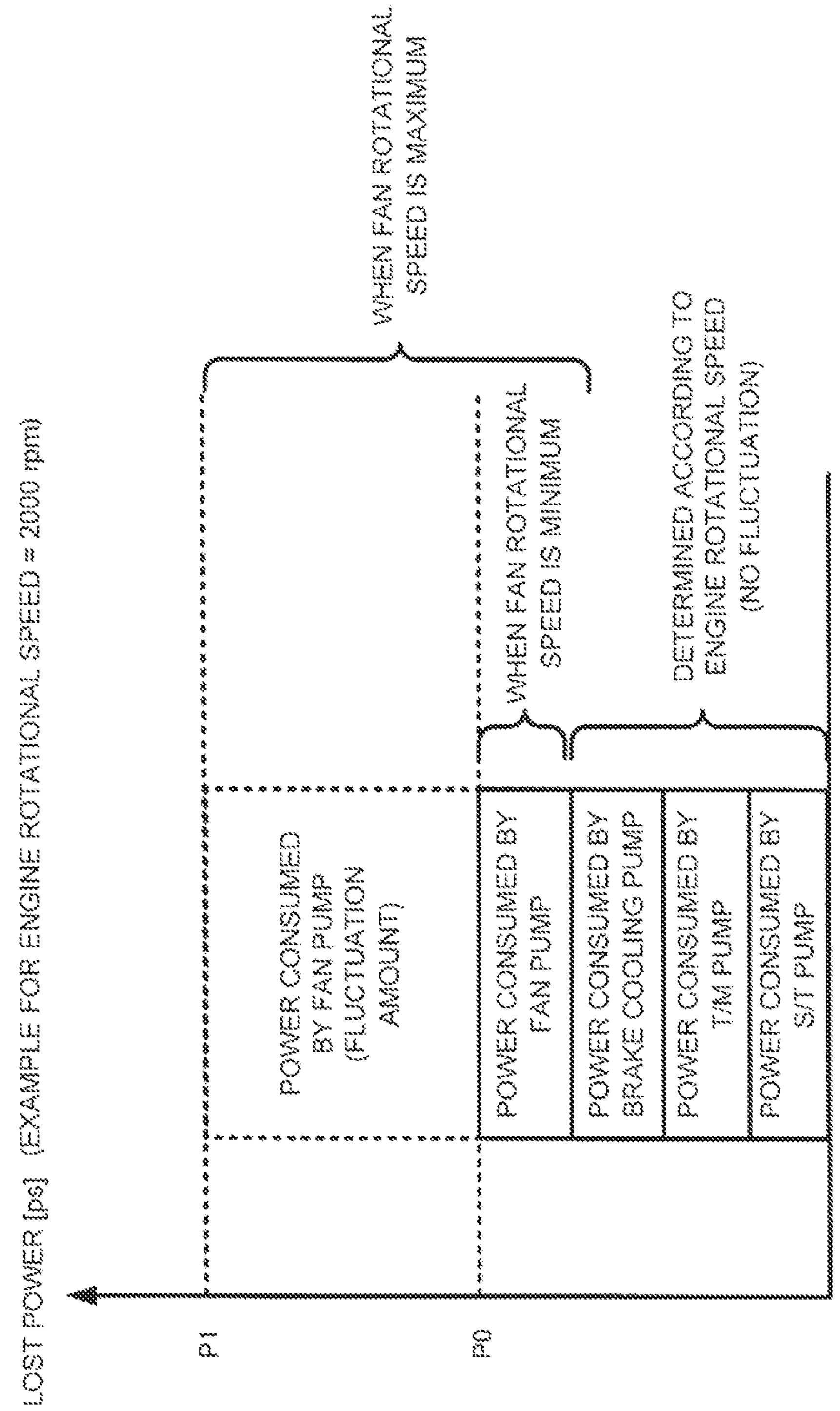
FIG. 5 is a figure showing an example of itemization of lost power.

In this embodiment, the lost power (i.e. the power that is consumed by the various auxiliary machines 15) is the total of the power consumed by the radiator fan pump 151, the power consumed by the aftercooler fan pump 152, the power consumed by the transmission pump 153, the power consumed by the steering pump 154, the power consumed by the brake cooling pump 155, and the power consumed by the air conditioner 156. In this connection, an itemization of these items of power consumption maybe, for example, as shown in FIG. 5. It should be understood that the example shown in FIG. 5 is one in which the engine rotational speed is 2000 [rpm], and, in this example, the power consumed by the air conditioner 156 is omitted from the figure, since it is comparatively low.

As described above, in this embodiment, the transmission pump 153, the steering pump 154, and the brake cooling pump 155 are fixed capacity type hydraulic pumps. The value of the power consumed by such a fixed capacity type hydraulic pump is principally determined by the rotational speed of the engine 12. Accordingly, the total load value calculation unit 222 is able to calculate the value of the power consumed by the transmission pump 153, the value of the power consumed by the steering pump 154, and the value of the power consumed by the brake cooling pump 155, on the basis of the rotational speed of the engine 12 that is inputted as an electrical signal ((7) in FIG. 1).

On the other hand, as described above, the radiator fan pump 151 and the aftercooler fan pump 152 are variable capacity type hydraulic pumps. Accordingly, the values of the power consumed by the radiator fan pump 151 and the aftercooler fan pump 152 are principally determined on the basis of the rotational speeds of the fans that are driven by these hydraulic pumps 151 and 152 (in other words by the rotational speeds of the radiator fan 157 and the aftercooler fan 158) and by the rotational speed of the engine 12. The reference to the rotational speed of the engine 12 is because consideration should be accorded to the efficiency of transmission of power from the engine 12 to the pumps 151 and 152, which changes according to the rotational speed of the engine 12.

Here, for each of the fans 157 and 158, a target value for the rotational speed of that fan (hereinafter termed its "target rotational speed") is determined on the basis of a current state value (for example, a temperature value) of the subject that is cooled by that fan (if it cools a plurality of subjects, of either all or a part thereof), and the rotational speed of that fan is controlled so that it becomes equal to its target rotational speed. Accordingly, the total load value calculation unit 222 calculates these target rotational speeds for the fans 157 and 158 on the basis of the current state values (for example, the temperature values) of the subjects that are cooled by the fans 157 and 158, and calculates the power consumed by the radiator fan pump 151 and the aftercooler fan pump 152 on the basis of these target rotational speeds that have been calculated and the rotational speed of the engine 12, that is inputted as an electrical signal ((7) of FIG. 1).

Now, the method for determining the target rotational speed of the radiator fan 157 will be explained in the following. As described above, the radiator 17 that is cooled by the radiator fan 157, along with cooling the cooling water, also cools the brake cooling hydraulic fluid, the T/C working hydraulic fluid, and the steering working hydraulic fluid via the cooling water. In other words, the radiator fan 157 not only directly cools the radiator 17, but indirectly cools the cooling water, the brake cooling hydraulic fluid, the T/C working hydraulic fluid, and the steering working hydraulic fluid. That is to say, the subjects that are cooled by the radiator fan 157 are the radiator 17, the cooling water, the brake cooling hydraulic fluid, the T/C working hydraulic fluid, and the steering working hydraulic fluid. Accordingly, the total load value calculation unit 222 calculates the target rotational speed for the radiator fan 157 on the basis of, for example, all or some of the cooling water temperature, the brake cooling hydraulic fluid temperature, the T/C working hydraulic fluid temperature, and the steering working hydraulic fluid temperature (which are inputted as electrical signals ((1) through (4) in FIG. 1). Moreover, the brake cooling hydraulic fluid temperature is raised by the operation of the retarder brake. Accordingly, it would also be acceptable to arrange for the total load value calculation unit 222 to calculate the target rotational speed by referring to the retarder lever actuation amount (which is inputted as an electrical signal ((6) in FIG. 1), instead of the brake cooling hydraulic fluid temperature, or in addition to the brake cooling hydraulic fluid temperature. Moreover, a condenser of the air conditioner 156 is positioned in the vicinity of the radiator 17, and this condenser is cooled by the radiator fan 157. It is necessary for this condenser of the air conditioner 156 to be cooled when the air conditioner 156 is ON. Accordingly, it would also be acceptable to arrange for the total load value calculation unit 222 to calculate the target rotational speed while referring to the electrical signal specifying the ON or OFF state of the air conditioner ((8) of FIG. 1). In the following, the state values that are used as foundations for determining the target rotational speed of the radiator fan 157 will be termed "foundation state values". In this embodiment, the temperature of the cooling water that is the subject of cooling, the brake cooling hydraulic fluid temperature, the T/C working hydraulic fluid temperature, the steering working hydraulic fluid temperature, the retarder lever actuation amount, and the state of the air conditioner (ON/OFF) are the foundation state values. Now, the way the target rotational speed of the radiator fan 157 is determined on the basis of these foundation state values will be explained in concrete terms with reference to FIG. 6.

Figure 6:
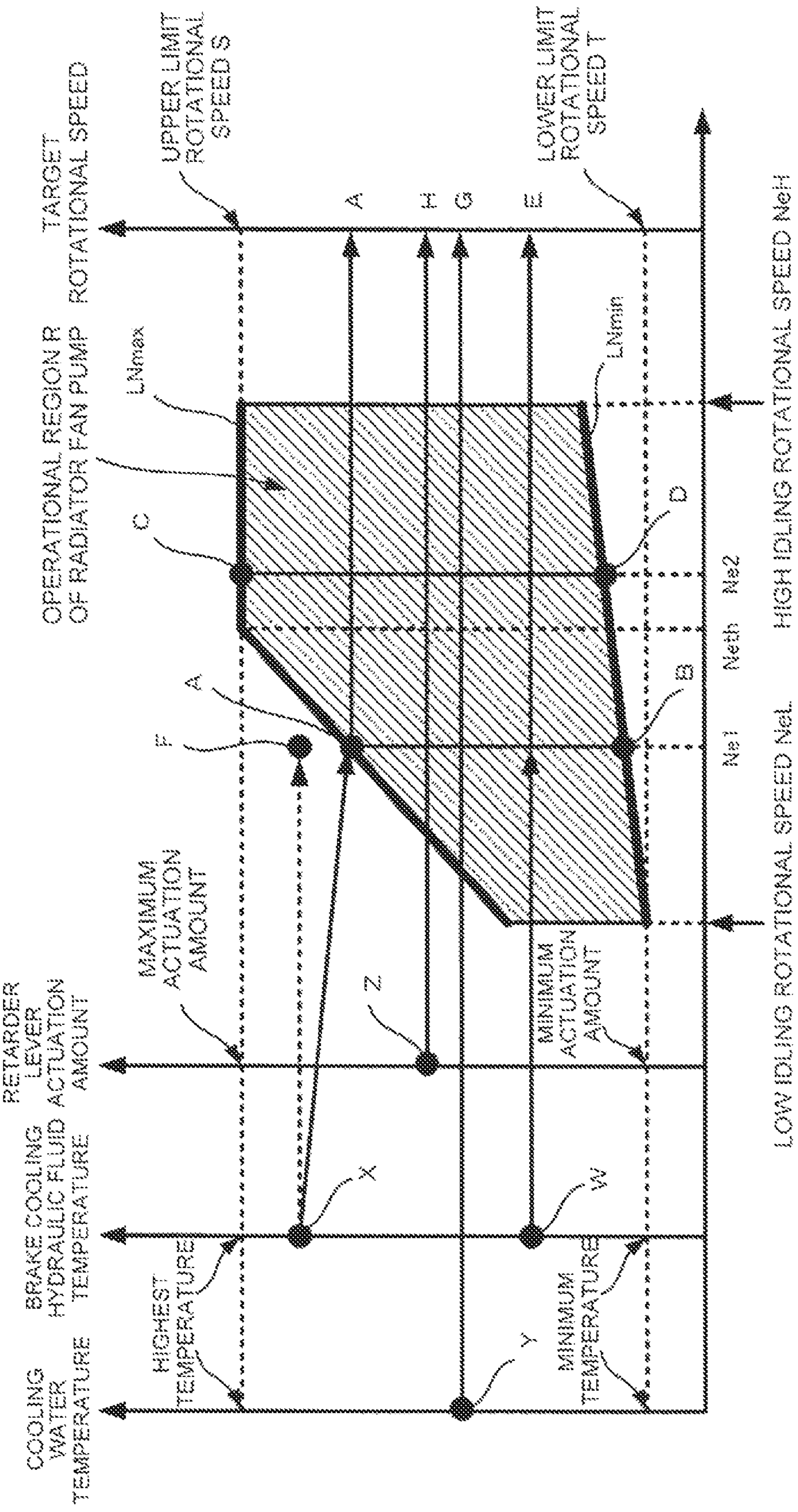
FIG. 6 is a figure showing a control map that is used for determining a target rotational speed for a radiator fan.

FIG. 6 is a figure showing a control map that is used for determining the target rotational speed for the radiator fan 157.

The engine 12 rotates in the range from the low idling rotational speed NeL to the high idling rotational speed NeH. An upper limit rotational speed S is an upper limit value for rotational speed (the radiator fan 157 is not to be rotated at a rotational speed greater than or equal to the upper limit rotational speed S) that is set by the design of the radiator fan 157 itself (from the standpoint of mechanical strength). The maximum rotational speed line LNmax shown by the thick solid line is data for control that gives the rotational speed of the radiator fan 157 when the capacity of the radiator fan pump 151 is kept to a maximum capacity that is set in advance for control of that pump 151 (this is normally smaller than the maximum capacity possessed by the pump 151 itself), and this is defined as a function of the engine rotational speed Ne. The maximum rotational speed line LNmax agrees with the above described upper limit rotational speed S in the range in which the engine rotational speed Ne is higher than a predetermined threshold value Neth. In the range lower than the above described threshold value Neth, the maximum rotational speed line LNmax has a value lower than the upper limit rotational speed S described above, and is an increasing function of the engine rotational speed Ne.

The minimum rotational speed line LNmin shown by the other thick solid line is data for control that gives the rotational speed of the radiator fan 157 when the capacity of the radiator fan pump 151 is kept to a minimum capacity that is set in advance for control of that pump 151 (this is normally the same as the minimum capacity possessed by the pump 151 itself), and this is also defined as an increasing function of the engine rotational speed Ne. The region surrounded between the maximum rotational speed line LNmax and the minimum rotational speed line LNmin (i.e. the hatched region) will be termed the "operating region" R of this auxiliary machine (in this example, of the radiator fan pump 151).

Within the operating region R of the radiator fan pump 151, the target rotational speed of the radiator fan 157 is determined according to the above described one or more foundation state values. For example, if the engine rotational speed is Ne1, then the target rotational speed is determined within a range from a point A that is a point upon the maximum rotational speed line LNmax to a point B that is a point upon the minimum rotational speed line LNmin. In a similar manner, if the engine rotational speed is Ne2, then the target rotational speed is determined within a range from a point C that is a point upon the maximum rotational speed line LNmax to a point D that is a point upon the minimum rotational speed line LNmin.

In the example of FIG. 6, for the convenience of explanation, only the three state values of the cooling water temperature, the brake cooling hydraulic fluid temperature, and the retarder lever actuation amount are shown as foundation state values for determining the target rotational speed of the radiator fan 157, but in this embodiment, as shown in FIG. 4, other state values (the T/C working hydraulic fluid temperature, the steering working hydraulic fluid temperature, and the air conditioner ON/OFF state) may also be employed.

As shown in FIG. 6, one-to-one correspondences are established between the values of the foundation state values in their ranges of variation (for example, from the highest temperature value to the minimum temperature value, or from the value of the maximum actuation amount to the value of the minimum actuation amount), and values of rotational speed within the operating region R from the maximum value of rotational speed (the upper limit rotational speed S) to the minimum value of rotational speed (the lower limit rotational speed T). Higher values of rotational speed correspond to higher values of the foundation state values. Using these correspondences between the values of the foundation state values and the target rotational speed, the target rotational speed within the operating region R is determined on the basis of the current values of the one or more state values and the engine rotational speed.

For example, suppose that the current engine rotational speed is Ne1. In this case, the target rotational speed can be determined within the permitted range A-B within the operating region R that corresponds to this current engine rotational speed Ne1. If the current value of the brake cooling hydraulic fluid temperature is W, then the rotational speed that corresponds to this value W is E. This value E is within the above described permitted range A-B, and this value E is chosen as one candidate for the target rotational speed obtained from the brake cooling hydraulic fluid temperature. On the other hand, if the current value of the brake cooling hydraulic fluid temperature is X, then the rotational speed that corresponds to this value X is F. However, since this value F is outside the above described permitted range A-B (the value F is greater than the value A), accordingly it is not possible to select the value F as the target rotational speed. Thus, the value A that is the closest within the permitted range A-B to the value F is chosen as one candidate for the target rotational speed on the basis of the brake cooling hydraulic fluid temperature.

By similar methods to that described above, candidates for the target rotational speed are also determined on the basis of the other foundation state values, for example for the cooling water temperature and for the retarder lever actuation amount. For example, when the current engine rotational speed is Ne1, with the current value of the brake cooling hydraulic fluid temperature being W and with the current value of the cooling water temperature being Y, if it is supposed that the current value of the retarder lever actuation amount is Z, then each of the rotational speed value E that corresponds to the value W, the rotational speed value G that corresponds to the value Y, and the rotational speed value H that corresponds to the value Z is selected as a candidate for the target rotational speed.

By doing this, from different foundation state values, different rotational speed values are selected as candidates for the target rotational speed. Next, a target rotational speed is determined on the basis of these different target rotational speed candidate values. Typically, the maximum value among the different target rotational speed candidate values is selected as the target rotational speed. By controlling the operation of the auxiliary machines (in this example, the radiator fan pump 151) in this manner using the maximum target value, the beneficial effect is obtained that it is possible more effectively to prevent problems that can occur due to deficiencies in performance of the auxiliary machines, for example overheating.

Furthermore, in the example described above, in order to determine the target value for the operational speed of the auxiliary machines (for example the target rotational speed of the radiator fan 157), not only are the state values used of the subject matter upon which the functions of this auxiliary machine operates (for example the brake cooling hydraulic fluid temperature and the cooling water temperature upon which the cooling function by the radiator fan 157 operates), but also state values that later become causes of the occurrence of future changes of the state values of this subject matter are used (for example the actuation amount of the retarder lever for adjusting the braking power of the retarder brake). By using state values of this type that become causes, there is the advantageous aspect that it is possible to control the operation of the auxiliary machine in an anticipatory manner, thus preventing beforehand the occurrence of any state of inconvenience.

The explanation now returns to FIG. 4. Next, the way in which the target rotational speed for the aftercooler fan 158 is determined will be explained. As described above, the aftercooler 18 that is cooled by the aftercooler fan 158 cools the compressed air. In other words, the aftercooler fan 158 not only directly cools the aftercooler 158, but also indirectly cools the compressed air. That is to say, the subject matter that is cooled by the aftercooler an 158 is the aftercooler 18 and the compressed air. Accordingly, the total load value calculation unit 222, for example, calculates the target rotational speed for the aftercooler fan 158 on the basis of the compressed air temperature that is inputted as an electrical signal ((5) in FIG. 1). In a similar manner to the case for the radiator fan 157, the target rotational speed for the aftercooler fan 158 as well is determined using a control map like the one shown in FIG. 6.

The power consumed by the air conditioner 156 is determined on the basis of the operational state of the air conditioner (in other words, whether it is ON or OFF). Accordingly, the total load value calculation unit 222 is able to calculate the power consumed by the air conditioner 156 on the basis of the state value that specifies whether the air conditioner is ON or OFF, which is inputted as an electrical signal ((8) in FIG. 1).

As described above, when the target values for the operational states of the various auxiliary machines are determined, the driving of each of the auxiliary machines is controlled so that the actual operational state of that auxiliary machine becomes its respective target value. Furthermore, the power that is being consumed by each of the auxiliary machines is calculated by the total load value calculation unit 222 on the basis of the respective target value for the operational state of that auxiliary machine. And the lost power is determined by the total load value calculation unit 222 totaling these calculated powers that are consumed by those auxiliary machines.

FIG. 7 is a figure showing how the gross output power and the main output power of the engine change with engine rotational speed, when the lost power consumed by the auxiliary machines 15 such as the pumps 151 through 155 and the air conditioner 156 and so on has changed.

In FIG. 7, the thin solid line shows the total load value (in other words, this is the sum of the lost power and the target main output value, and this is also the provisional output value shown in FIG. 2) when the lost power is at its minimum value (in other words, when the power consumed by the various types of auxiliary machines is at its minimum). In this case, the total load value is not greater than the previously described predetermined adjusted output upper limit value. Due to this, the gross output value of the engine 12 is controlled to a value that agrees with the total load value described above. As a result, as shown by the thin dotted line in FIG. 7, the main output power of the engine 12 that is distributed to the main machine (for example to the propulsion device 14) is controlled to a value obtained by eliminating the value of the lost power from the total load value, and this is equal to the target main output value. In a similar manner, when the lost power is small and the total load value is less than or equal to the adjusted output upper limit value (this is the low power region), the main output power of the engine 12 is controlled so as to agree with the target main output value. Accordingly, the main machine (for example, the propulsion device 14) is able to exhibit sufficient performance.

In FIG. 7, the single dotted broken line shows the total load value (in other words, this is the sum of the lost power and the target main output value, and this is also the provisional output value shown in FIG. 2) when the lost power is at its maximum value (in other words, when the power consumed by the auxiliary machines of various types 15 is at its maximum). In this case, in a range in which the engine rotational speed is higher than some value V, the total load value exceeds the previously described predetermined adjusted output upper limit value. Due to this, when the engine rotational speed is greater than V, the gross output value of the engine 12 is limited to the lower adjusted output upper limit value. In FIG. 7, the gross output value which is limited in this manner is shown by the thick solid line. As a result, as shown by the thick dotted line in FIG. 7, the main output value of the engine 12 that is distributed to the main machine (for example to the propulsion device 14) is controlled to a value equal to this limited gross output value minus the value of the maximum lost power, and this is slightly smaller than the target main output value shown by the thin dotted line (i.e. the main output value in the case of the low power region). However, since the width by which the main output value drops below the target main output value is not so very great, accordingly the performance decrease of the main machine (for example of the propulsion device 14) is so small that in actual practice it maybe ignored. By a similar procedure, if the lost power is high and the total load value exceeds the adjusted output upper limit value (i.e. is in the high power region), then the gross output value is limited to the adjusted output upper limit value. Due to this, deterioration of the fuel consumption below the desired value is prevented.

The embodiment of the present invention described above is only given by way of example for explanation of the present invention; the scope of the present invention should not be considered as being limited by this embodiment. Provided that the gist of the present invention is preserved, it may be implemented in various other kinds of ways.

While in this embodiment the propulsion device 14 was the main machine, it would also be acceptable for some device other than the propulsion device 14 (for example, the steering pump 154 that supplies working hydraulic fluid to the hoist mechanism, or the like) to be the main machine. Moreover, it would also be acceptable to arrange to take into consideration other auxiliary machines 15 as the auxiliary machines 15 that are used for calculating the lost power; and also it would also be acceptable to arrange not to take into consideration those auxiliary machines whose power consumption is comparatively small (for example the air conditioner 156) in the calculation of the lost power.

In this embodiment, in the low power region, the gross output value is adjusted to the value of the total load, and in the high power region, the gross output value is adjusted to the adjusted output upper limit value. As a variant example it would also be acceptable, for example, in the low power region, for the gross output value to be adjusted to a value that is greater than or equal to the value of the total load power, and in the high power region, for the gross output value to be adjusted to a value that is less than or equal to the adjusted output upper limit value. In the case of control in this manner as well, in the low power region, it is possible to maintain the main output power at a value that is sufficient for the main machine to exhibit its performance (for example greater than or equal to the target main output power), while, in the high power region, it is possible to prevent deterioration of the fuel consumption.

EXPLANATION OF THE REFERENCE SYMBOLS

1: dump truck, 12: engine, 13: PTO, 14: propulsion device, 141: torque converter, 142: transmission, 143: axle, 144: wheels, 15: auxiliary machine, 151: radiator fan pump, 157: radiator fan, 152: aftercooler fan pump, 158: aftercooler fan, 153: transmission pump, 154: steering pump, 155: brake cooling pump, 156: air conditioner, 16: brake, 161: brake pedal, 162: retarder lever, 17: radiator, 18: aftercooler, 19: turbocharger, 21: engine CTL, 211: engine drive control unit, 22: transmission CTL, 222: total load value calculation unit, 223: gross output value control unit, 31: cooling water temperature sensor, 32: T/C working hydraulic fluid temperature sensor, 33: brake cooling hydraulic fluid temperature sensor, 34: steering working hydraulic fluid temperature sensor, 35: compressed air temperature sensor, 36: retarder lever actuation amount sensor.

The invention claimed is:

1. An engine output control device that controls an engine that simultaneously drives at least one main machine and one auxiliary machine or more, wherein:

the main machine is a travelling device or both of a travelling device and a working device among devices that are driven by output of the engine;

the auxiliary machine is a device whose output is variable and which is driven by engine output of a machine other than the main machine, comprising:

a total load value calculation unit that calculates a value of lost power consumed by said auxiliary machine, and calculates a value of total load power, which is the total of the power that must be supplied to said main machine and to said auxiliary machine, by adding a target value for main output power of said engine distributed to said main machine to the value of said lost power;

a gross output value control unit that controls the value of gross output power outputted from said engine itself, according to the value of said total load power; and an engine drive control unit that controls the operation of said engine according to control of the value of said gross output power by said gross output value control unit;

and wherein said gross output value control unit has a threshold value that is set within the range of variation of the value of said gross output power, and controls the value of said gross output power to become equal to the value of said total load power when the value of said total load power is smaller than said threshold value, while controlling the value of said gross output power to become equal to said threshold value when the value of said total load power is larger than said threshold value.

2. An engine output control device according to claim 1, wherein said total load value calculation unit changes said target value for said main output power according to rotational speed of said engine.

3. An engine output control device according to claim 1, wherein said total load value calculation unit inputs signals specifying two or more state values:

from a plurality of sensors that detect respective state values of some two or more of said auxiliary machines, determines two or more candidate values for the power consumed by said some auxiliary machines on the basis of said two or more respective state values specified by said signals that are inputted;

and selects the maximum value among said two or more candidate values that have been determined as the value of lost power consumed by said some auxiliary machines.

4. An engine output control device according to claim 2, wherein said total load value calculation unit inputs signals specifying two or more state values:

from a plurality of sensors that detect respective state values of some two or more of said auxiliary machines, determines two or more candidate values for the power consumed by said some auxiliary machines on the basis of said two or more respective state values specified by said signals that are inputted;

and selects the maximum value among said two or more candidate values that have been determined as the value of lost power consumed by said some auxiliary machines.

5. An engine output control device that controls an engine that simultaneously drives at least one main machine and one or more auxiliary machines, wherein:

the main machine is a travelling device or both of a travelling device and a working device among devices that are driven by output of the engine;

the auxiliary machine is a device whose output is variable and which is driven by engine output of a machine other than the main machine, comprising:

a total load value calculation unit configured to
- store a target value for main output power,
- estimate actual lost power consumed by the one or more auxiliary machines, and
- calculate a total load power by adding the target value to the estimated actual lost power;

a gross output value control unit configured to
- store a threshold value that is set to be within a range of variation of a gross output power of the engine,
- compare the total load power to the threshold value,
- determine that the gross output power is equal to the total load power when the total load power is smaller than or equal to the threshold value, and
- determine that the gross output power is equal to the threshold value when the total load power is larger than the threshold value; and an engine drive control unit configured to control operation of the engine based on the gross output power determined by the gross output value control unit, wherein the main output power is a portion of power from the engine that is distributed to the main machine, the total load power is an estimate of an amount of power to be supplied to the main machine and to the one or more auxiliary machines by the engine, and the gross output power is an actual amount of power supplied to the main machine and to the one or more auxiliary machines by the engine.

6. An engine output control device according to claim 5, wherein the total load value calculation unit is further configured to change the target value for the main output power according to a rotational speed of the engine.

7. An engine output control device according to claim 6, wherein the one or more auxiliary machines comprise two or more auxiliary machines, the total load value calculation unit is configured to
- receive input signals specifying a plurality of state values from a plurality of sensors that detect respective state values of a plurality of selected machines from the two or more auxiliary machines,
- determine a plurality of candidate values for the power consumed by the two or more auxiliary machines on the basis of the plurality of respective state values, and
- select the maximum value among the plurality of candidate values as the actual lost power.

8. An engine output control device according to claim 5, wherein the one or more auxiliary machines comprise two or more auxiliary machines, the total load value calculation unit is configured to
- receive input signals specifying a plurality of state values from a plurality of sensors that detect respective state values of a plurality of selected machines from the two or more auxiliary machines,
- determine a plurality of candidate values for the power consumed by the two or more auxiliary machines on the basis of the plurality of respective state values, and
- select the maximum value among the plurality of candidate values as the actual lost power.

* * * * *